United States Patent
Wakizaka

(10) Patent No.: US 6,349,323 B1
(45) Date of Patent: Feb. 19, 2002

(54) ASYNCHRONOUS TRANSFER MODE COMMUNICATION SYSTEM

(75) Inventor: Mayumi Wakizaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/097,711

(22) Filed: Jun. 16, 1998

(30) Foreign Application Priority Data

Jun. 24, 1997 (JP) .............................................. 9-167503

(51) Int. Cl.$^7$ .............................................. G06F 15/16
(52) U.S. Cl. ..................... 709/200; 370/331; 370/392
(58) Field of Search .............................. 709/236, 214, 709/229, 221, 200, 203, 227, 228, 250, 238, 223, 209, 201; 370/349, 331, 468, 280, 395, 60, 393, 58.2, 60.1, 351, 277, 392, 397, 233, 399; 455/553; 365/49

(56) References Cited

U.S. PATENT DOCUMENTS

| | | | | | |
|---|---|---|---|---|---|
| 5,381,407 A | * | 1/1995 | Chao | ........................... | 370/233 |
| 5,414,701 A | * | 5/1995 | Shtayer et al. | .............. | 370/58.2 |
| 5,422,838 A | * | 6/1995 | Liu | ........................... | 365/459 |
| 5,430,715 A | * | 7/1995 | Corbalis et al. | .............. | 370/60 |
| 5,440,547 A | * | 8/1995 | Easki et al. | ..................... | 370/60 |
| 5,467,349 A | * | 11/1995 | Huey et al. | ................. | 370/60.1 |
| 5,469,543 A | * | 11/1995 | Nishihara et al. | ........... | 709/234 |
| 5,483,525 A | * | 1/1996 | Song et al. | .................. | 370/392 |
| 5,515,370 A | * | 5/1996 | Rau | ........................... | 370/60.1 |
| 5,537,411 A | * | 7/1996 | Plas | ........................... | 370/397 |
| 5,568,486 A | * | 10/1996 | Huscroft et al. | ............. | 370/395 |
| 5,732,081 A | * | 3/1998 | Grenot et al. | ................. | 370/392 |
| 5,745,488 A | * | 4/1998 | Thompson et al. | ......... | 370/395 |
| 5,757,796 A | * | 5/1998 | Hebb | .......................... | 370/393 |
| 5,787,077 A | * | 7/1998 | Kuehnel et al. | ............. | 370/331 |
| 5,875,185 A | * | 2/1999 | Wang et al. | ................. | 370/331 |
| 5,889,949 A | * | 3/1999 | Charles | ....................... | 709/214 |
| 5,898,689 A | * | 4/1999 | Kumar et al. | ................ | 370/232 |
| 5,936,959 A | * | 8/1999 | Joffe | ........................... | 370/397 |
| 5,940,381 A | * | 8/1999 | Freeburg et al. | ............. | 370/331 |
| 5,940,385 A | * | 8/1999 | Mita et al. | ................... | 370/349 |
| 5,943,344 A | * | 8/1999 | Keller et al. | ................. | 370/468 |
| 5,956,336 A | * | 9/1999 | Loschke et al. | ............. | 370/392 |
| 5,978,361 A | * | 11/1999 | Kobudo | ....................... | 370/280 |
| 5,991,639 A | * | 11/1999 | Rautiola et al. | ............. | 455/553 |
| 6,034,958 A | * | 3/2000 | Wlcklund | .................... | 370/395 |
| 6,041,049 A | * | 3/2000 | Brady | ......................... | 370/351 |
| 6,088,355 A | * | 7/2000 | Mills et al. | .................. | 370/392 |
| 6,111,858 A | * | 8/2000 | Greaves et al. | ............. | 370/256 |
| 6,222,842 B1 | * | 4/2001 | Sasyan et al. | ............... | 370/397 |
| 6,243,363 B1 | * | 6/2001 | Quinquis et al. | ........... | 370/277 |

FOREIGN PATENT DOCUMENTS

| | | |
|---|---|---|
| JP | 5-130134 | 5/1993 |
| JP | 5-252177 | 9/1993 |
| JP | 07312609 A | 11/1995 |
| JP | 08242237 A | 9/1996 |

OTHER PUBLICATIONS

Abmus–Nunes, transmission of Coded Sound Sugnals in a future ATM network EBU tecnical review Summer 1994.*
Mika Lepistu, ATM chips and products, www.cs.tut.fi/tlt/stuff/atm/mika/atm_mika,html. Jan. 1995.*

\* cited by examiner

Primary Examiner—Mark H. Rinehart
Assistant Examiner—Thong Vu
(74) Attorney, Agent, or Firm—Whitham, Curtis & Christofferson, P.C.

(57) ABSTRACT

A communication system which can establish a control link between a radio base station and a switchboard station, without assigning beforehand any representative or proper VPI/VCI to the radio base station which is to be newly established. A switchboard station transmits a cell which includes a link establishment request signal to a newly established radio base station. Therefore, the radio base station can receive the cell, regardless of the VPI/VCI values, because a mask set up unit in the radio base station sets mask approval, beforehand. Further, the radio base station, after receiving the cell which includes a link establishment request signal, stores the VPI/VCI values included in that cell in a down cell header information memory, and transmits a response signal.

9 Claims, 3 Drawing Sheets

ASYNCHRONOUS TRANSFER MODE COMMUNICATION SYSTEM

BACKGROUND OF THE INVENTION

1. Field of the Invention

The present invention relates to a communication system, particularly a mobile communication system, wherein a control link between a switchboard station and a radio base station can be established by control signals by using ATM (Asynchronous Transfer Mode) cells.

2. Description of the Prior Art

A mobile communication system includes switchboard stations which are connected with public network and with a plurality of radio base stations which are connected with a switchboard station. In order to establish the control link between a switchboard station and a radio base station, ATM information transmission has been utilized.

In ATM information transmission, fixed length packet (ATM cell) is used. A 24 bit storage region for VPI(Virtual Path Identifier)/VCI (Virtual Channel Identifier) is given at the heading field(header portion), to store the address of the transmitter.

Particularly, in case of establishing a control link between a switchboard station and each radio base station by utilizing ATM information transmission, the switchboard station writes the specific VPI/VCI values which are assigned to the radio base station with whom the switchboard station want to establish control link in the VPI/VCI region of an ATM cell which is to be transmitted.

For example, the radio base station shown in FIG. 4 has VPI/VCI comparison unit 41 and inter-station control signal processing unit 42. After receiving an ATM cell, the radio base station compares the VPI/VCI values which are included in the received ATM cell with the VPI/VCI values stored in VPI/VCI comparison unit 41.

When they are found to be identical, the radio base station recognizes that the ATM cell is directed to itself and then outputs the received ATM cell to the inter-station control signal processing unit 42.

Thus, in the ATM communication, information transmission can not be executed, unless the receiving side (the radio base station) knows the specific VPI/VCI values.

However, the load of the radio base station for assigning and confirming the specific VPI/VCI values is heavy.

Therefore, hitherto, in order to reduce the load of the radio base station, special VPI/VCI values called representative VPI/VCI values have been assigned beforehand to the radio base station which prepares to open.

The representative VPI/VCI values are given to all the newly established radio base stations and are different from the specific VPI/VCI values peculiar to each radio base station.

The switchboard station transmits, to a newly established radio base station, an ATM cell in which a representative VPI/VCI values are written in the VPI/VCI storage region.

The radio base station compares the representative VPI/VCI values with the VPI/VCI values memorized by itself. Here, because the VPI/VCI values memorized by the radio base station are, as explained above, the representative VPI/VCI values, the radio base station can receive an ATM cell transmitted by the switchboard station. Then, the radio base station requests a formal (proper) VPI/VCI values. Thus, a temporal link between the switchboard station and the radio base station is established. Hereafter, the switchboard station notices the formal VPI/VCI values to the radio base station. The radio base station, after receiving the formal VPI/VCI values, memorizes them to communicate by using the formal VPI/VCI values, hereafter.

However, the prior art as explained above has a disadvantage that it spares much time to establish a link between the switchboard station and the radio base station. Further, the formal link can not be established, unless a temporal link is established by using a representative VPI/VCI.

Furthermore, the prior art as explained above has another disadvantage that there is a possibility of failure in the link establishment, because it is necessary to execute complex control procedures, such as an alteration of the designation of the switch address (path setting) in an ATM switch that switches ATM cells in the switchboard station.

Still, the prior art as explained above has a disadvantage that the resource of VPI/VCI values is reduced, because special representative VPI/VCI values must be preserved.

SUMMARY OF THE INVENTION

Therefore, an object of the present invention is to provide a communication system which can establish a control link between the radio base station and the switchboard station, without assigning beforehand a representative or proper VPI and VCI values to the radio base station which is to be newly established.

Another object of the present invention is to provide a communication system that can shorten the time for establishing a control link between the switchboard station and the radio base station.

In accordance with the present invention, there is provided an ATM communication system, which comprises a first station for transmitting ATM cell, and a second station connected with the first station for receiving said ATM cell.

The second station comprises a comparison means for comparing the VPI and VCI which are written in said ATM cell with proper VPI and VCI of said second station, a signal processing means for receiving said ATM cell, when said ATM cell is identical with said proper VPI and VCI, and a mask set up means for invalidating the comparison result in said comparison means.

In this system, ATM cell can be received, even when proper VPI/VCI are not yet assigned to the second station.

There is also provided a method for establishing a link between the radio base station and the switchboard station.

This method comprises the steps of receiving all the ATM cells transmitted by the switchboard station, regardless of the VPI and VCI written in the ATM cells, until the radio base station receives the ATM cell which includes a link establishment request signal, comparing the VPI and VCI which are written in the ATM cell with proper VPI and VCI for the radio base station, and establishing control link by transmitting ATM cell from the switchboard station to the radio base station, when the VPI and VCI written in received ATM cell is found to be identical with said proper VPI and VCI.

After all, the switchboard station transmits a cell including the link establishment request signal to a newly established radio base station. The radio base station can receive the cell, regardless of the VPI/VCI values written in the cell header, because a mask set up unit in the radio base station sets mask approval, beforehand.

Further, the radio base station, after receiving the cell including the link establishment request signal, stores the VPI and VCI values included in that cell in a down cell header information memory, and transmits a response signal cell in which this VPI and VCI values is written in the cell header.

According to the present invention, the time required to establish a link between a switchboard station and a radio base station can be greatly reduced. The reason lies in that the mask set up unit which invalidates the comparison result is provided in the VPI/VCI comparison unit of the radio base station in order to enable the radio base station to receive ATM cell from the switchboard station without identifying the VPI/VCI values assigned to itself. In other words, the VPI/VCI values which is to be assigned to a radio base station are inserted in the above mentioned ATM cell.

Further, according to the present invention, it can never occur that the link is not established. The reason lies in that the switchboard station decides VPI and VCI values which are to be assigned to a radio base stations, and sets up the communication path by using this VPI/VCI values.

Furthermore, according to the present invention, the VPI/VCI resource is never wasted. The reason lies in that the mask set up unit which invalidates the comparison result is provided in the VPI/VCI comparison unit of radio base station in order to enable the radio base station to receive ATM cell from the switchboard station without identifying the VPI/VCI values assigned to itself. In other words, the necessity of special representative VPI and VCI is eliminated.

BRIEF EXPLANATION OF THE DRAWINGS

FIG. 3 is a sequence diagram showing the procedure of the link establishment in the mobile communication system in FIG. 1.

DESCRIPTION OF THE PREFERRED EMBODIMENT

Figure 1:
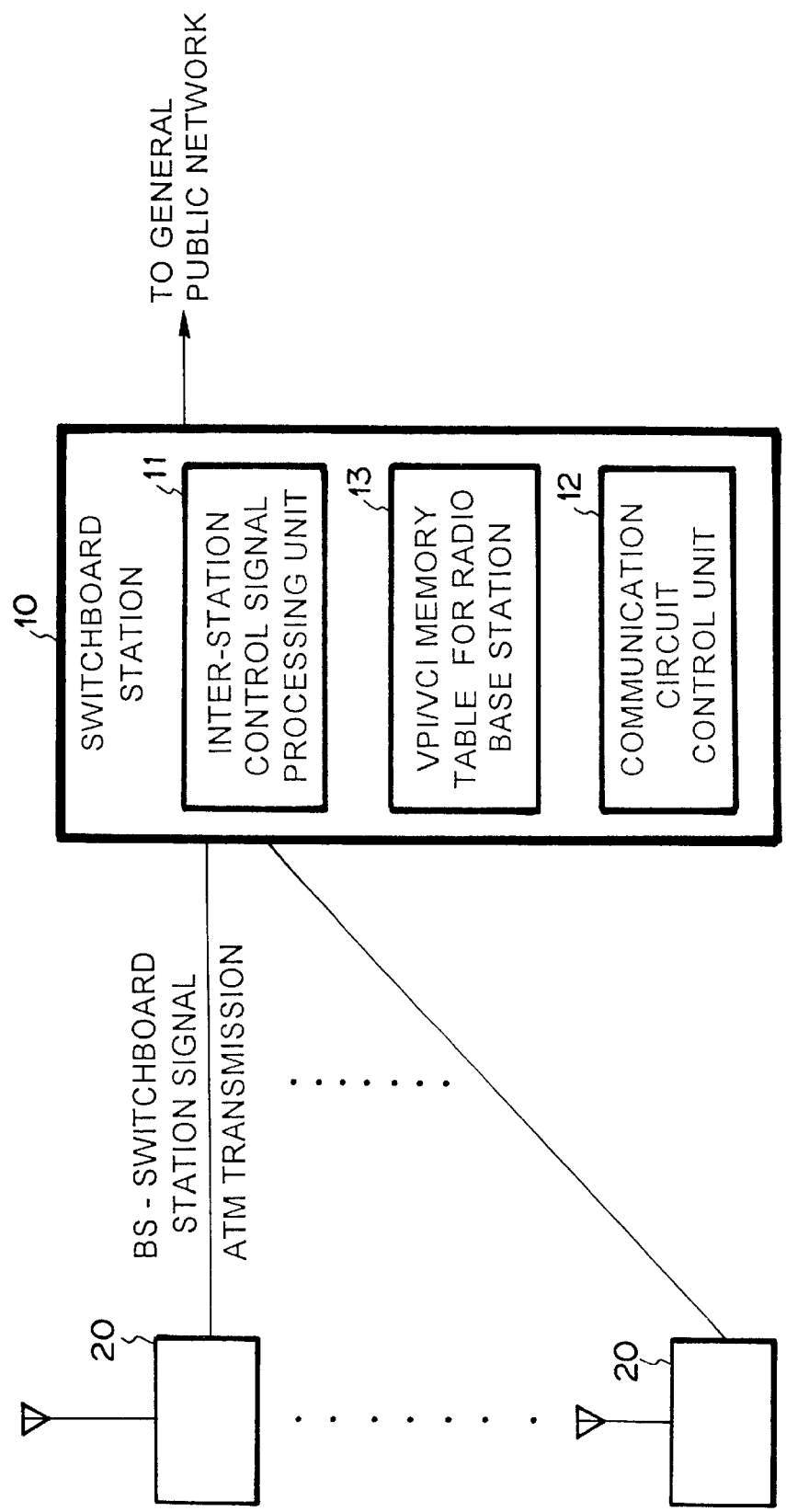
FIG. 1 is a block diagram of the preferred embodiment of the present invention.

Referring to the drawings, the mode of the present invention is explained in detail.

The preferred embodiment of the present invention is shown in FIG. 1. The communication system as shown in FIG. 1 comprises a switchboard station 10 which is connected with general public network and N radio base stations (BS) 20 which are connected with switchboard station 10.

Further, switchboard station 10 comprises inter-station control signal processing unit 11 which processes the control signals between switchboard station 10 and radio base stations 20, network control unit 12 which controls network between inter-station control signal processing unit 11 and N radio base stations 20, using the specific VPI/VCI values which is assigned to each radio base station, and VPI/VCI memory table 13 which memorizes the specific VPI/VPI values assigned to N radio base stations 20.

Figure 2:
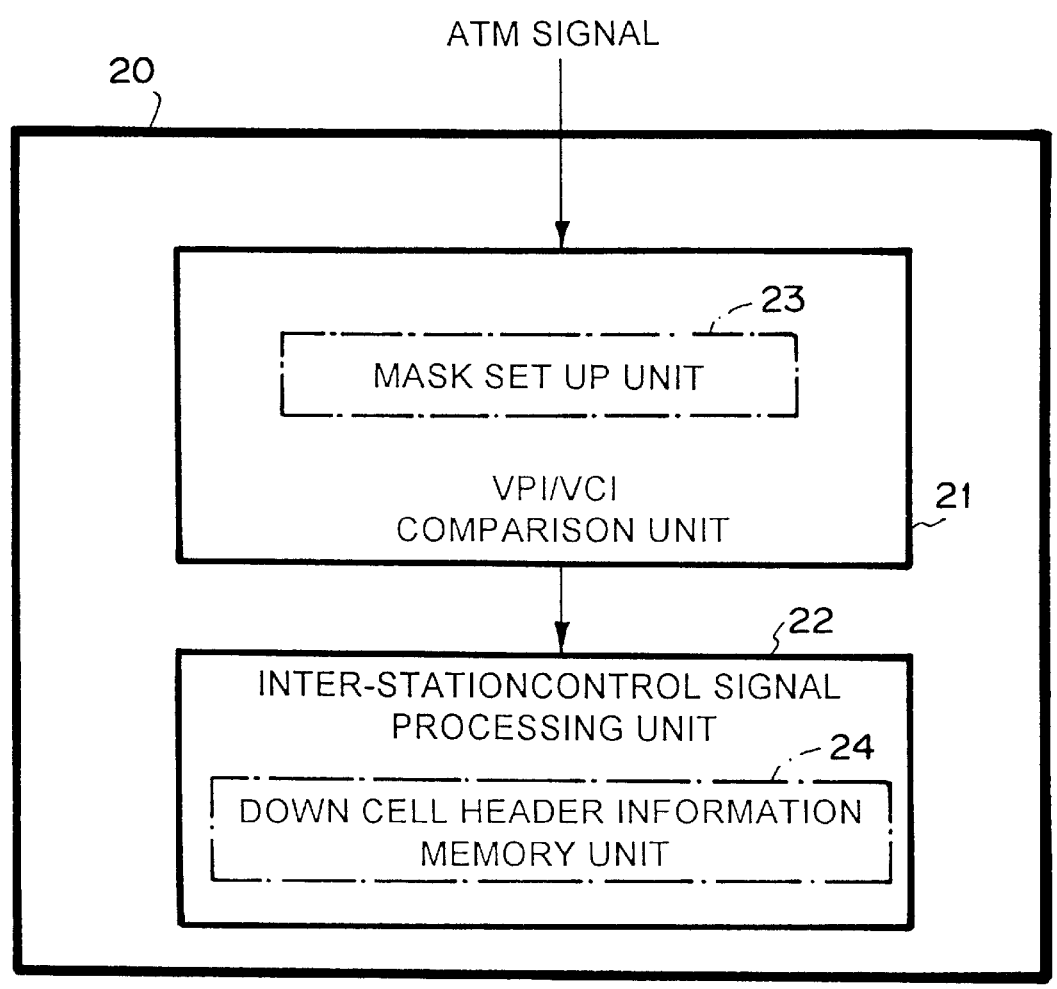
FIG. 2 is a block diagram of the detail of the radio base station in FIG. 1.

Each of the N radio base stations 20, as shown in FIG. 2, includes VPI/VCI comparison unit 21 which receives ATM cells from switchboard station 10 and inter-station control signal processing unit 22 which analyzes the contents of the received cells.

VPI/VCI comparison unit 21, including a 24 bit comparator (not shown in FIG. 2), compares bit by bit the VPI/VCI values which are created as described later with the VPI/VCI values which are written in the header of the ATM cell which is transmitted from switchboard station 10

Furthermore, VPI/VCI comparison unit 21,including a mask set up unit 23, can invalid (mask) the comparison result obtained by the comparator. In other words, mask set up unit 23 deems that these values are identical, regardless of the comparison result obtained by the comparator. Such a mask set up unit 23 can be constructed by, for example, 24 logic gates(OR gates). Particularly, each bit of the comparator output is inputted into one of the input of the OR gates, and a mask approval/prohibition signal is inputted into the other input of the OR gates. Further, the mask approval/prohibition signal is supplied, as described later, by inter-station control signal processing unit 22.

Inter-station control signal processing unit 22 comprises a memory means (not shown in FIG. 2) which stores-the received ATM cells, a CPU(not shown in FIG. 2) which analyzes the contents of the ATM cells which are stored in this memory, and down cell header information memory unit 24 which memorizes the VPI/VCI values in the header part of the received ATM cells. Further, down cell header information memory unit 24 comprises a latch circuit (not shown in FIG. 2) and a 24 bit register (not shown in FIG. 2).

The CPU of inter- station control signal processing unit 22 sets up VPI/VCI values which are stored in the register as comparison bit of the comparator of VPI/VCI comparison unit 21. Further, the CPU hands over a mask approval/prohibition signal to mask set up unit 23 of VPI/VCI comparison unit 21.

Figure 3:
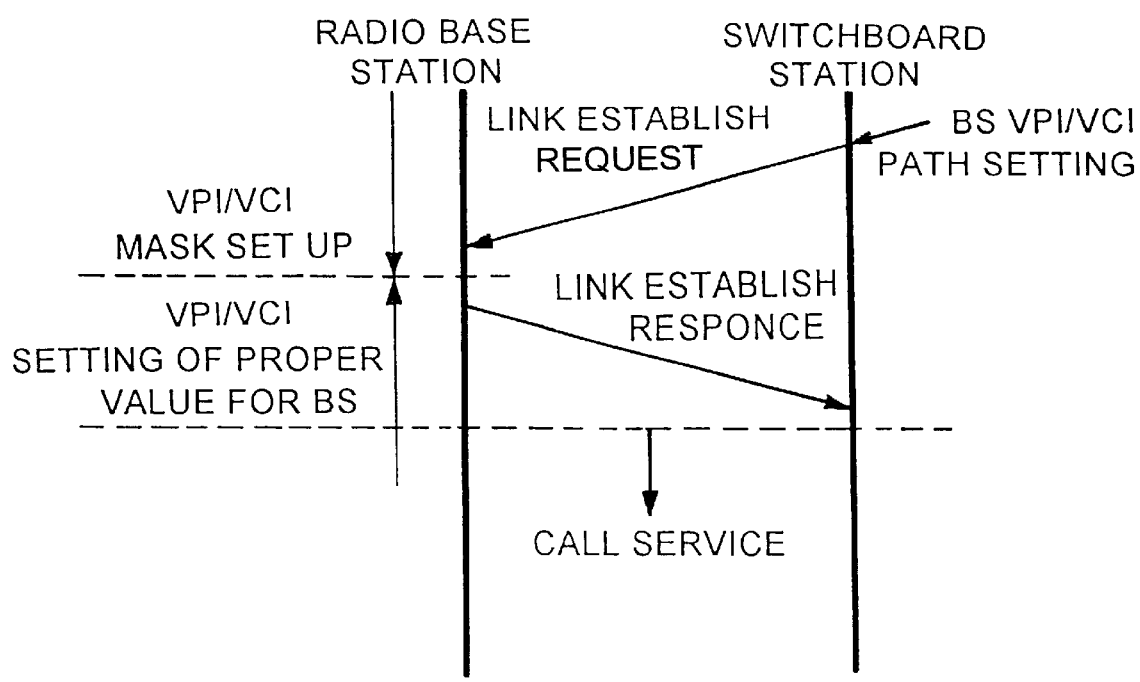
FIG. 3 is a block diagram of the detail of the radio base station in FIG. 1.
Figure 4:
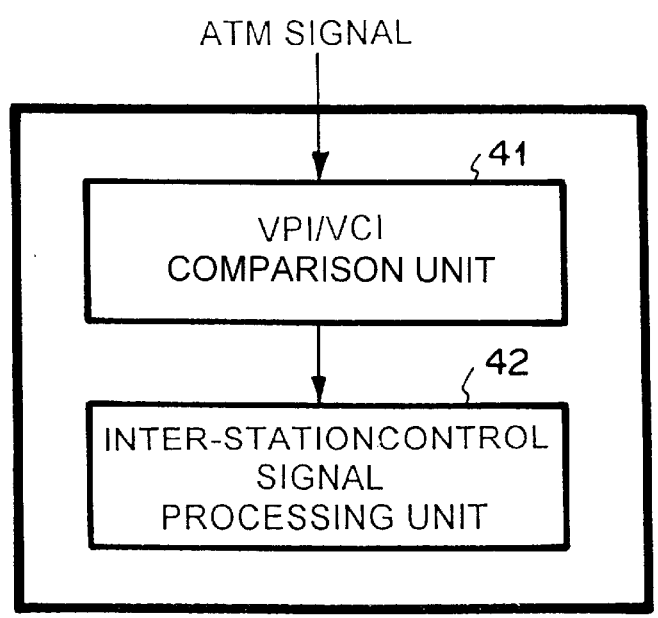
FIG. 4 is a block diagram showing the construction of the prior radio base station.

Next, referring to FIGS. 1 to 3, the way how the communication system of the present invention works is explained as follows.

When switchboard station 10 prepares to establish N radio base stations, it registers, in the VPI/VCI table, the VCI/VPI values which are assigned to each radio base station. Then, the bus of the circuit control unit is set up in order that inter-station control signal unit 11 is connected with each radio base station by using registered VPI/VCI.

After such a preparation, switchboard station 10 transmits the control link establishment request signal in the form of ATM cell sequentially to each radio base station. For example, when switchboard station 10 transmits an ATM cell to the first radio station among N radio base stations 20, switchboard station 10 reads out the VPI/VCI values for the first station and writes the VPI/VCI values which have been read-out, into the header part of an ATM cell which is to be transmitted. Then, switchboard station 10 establishes the communication link for circuit control unit 12, and transmits the ATM cell created beforehand for the first radio base station.

At the time of the opening of the radio base station, neither the specific VPI/VCI values, nor the representative VPI/VCI values is assigned to any of the N radio base stations 20. Instead, in mask set up unit 23, the mask approval signal is inputted from inter-station control signal processing unit 22. Hereby, each radio base station can receive ATM cells from the switchboard station, even if the specific VPI/VCI values or the representative VPI/VCI values have not yet been given.

For example, when each radio base station receives the link establishment request signal in the form of 53 Byte ATM cell from switchboard station 10, each radio base station stores 24 bit VPI/VCI values which occupies from the 5-th bit to the 28-th bit in the cell header part (the front 5 Bytes) in down cell header information memory unit 24. Then, the 24 bit bit VPI/VCI values are inputted into the comparator of VPI/VCI comparison unit 21.

At this moment, the comparator can not identify the 24 bit VPI/VCI values, because VPI/VCI values are not yet assigned to the radio base station. However, the output of the comparator is masked, because the mask set up approval signal is inputted in mask set up unit 23. Accordingly, the VPI/VCI values are deemed to be identical. As a result,-the ATM cell which carries the link establishment request signal is received by inter-station control signal processing unit 22, and is written in its memory. Then, the VPI/VCI values written in the header part of the ATM cell is latched by the latch circuit of the down cell header information memory unit 24 and the latched values is stored in the 24 bit register.

Next, the CPU of inter-station control signal processing unit 22 reads out the received cell information from its memory and analyzes the content. The CPU, after recognizing that the received cell includes the link establishment request signal, reads out 24 bit VPI/VCI values from the register and sets up the read-out values as values to be compared in the comparator of VPI/VCI comparison unit 21, while the CPU transmits mask prohibition signal to mask set up unit 23 (, or stops transmitting mask approval signal ) in order to cancel the masking of comparison result in mask set up unit 23.

Next, the CPU of inter-station control signal processing unit 22 creates ATM cell in order to transmits a link establishment response signal to switchboard station 10.

Next, the CPU reads out 24 bit VPI/VCI values stored in the register of down cell header information memory unit 24, and writes the read-out values in VPI/VCI storage region of the header part of the ATM cell. The ATM cell thus created is transmitted to the switchboard station.

Switchboard station 10, after receiving link establishment response signal in the form of ATM cell, confirms that the communication link has been established. Afterwards, the communication becomes possible between the switchboard station 10 and the radio base station which transmitted a link establishment response signal.

As described above, the present invention enables each radio base station to receive ATM cell regardless of the VPI/VCI values at the time of the opening of the radio base station.

Accordingly, the control link between the radio base station and the switchboard station can be established without setting up beforehand VPI/VCI values which are specific to each radio base station.

Furthermore, the present invention enables the switchboard station to write the VPI/VCI values to be assigned to the addressed radio base station in the ATM cell for transmitting the link establishment request signal, and enables each radio base station to memorize the VPI/VCI values written in the received ATM cell and to identify each values to be the VCI/VPI values assigned to itself.

Although the present invention has been shown and described with respect to the best mode embodiment thereof, it should be understood by those skilled in the art that the foregoing and various other changes, omissions, and additions in the form and detail thereof may be made therein without departing from the spirit and scope of the present invention.

What is claimed is:

1. An ATM (Asynchronous Transfer Mode) communication system, wherein an ATM cell which is transmitted by a first station is received by a second station, even when the proper VPI (Virtual Path Identifier) and VCI(Virtual Channel Identifier) have not yet been assigned to said second station, said communication system comprising:

a first station for transmitting an ATM cell; and a plurality of second stations connected with said first station for receiving said ATM cell, each of said plurality of second stations comprising:

a comparison means for comparing the VPI and VCI which are written in said ATM cell with a proper VPI and VCI for each of said second stations;

a signal processing means for receiving said ATM cell, when the VPI and VCI which are transmitted by said first station are identical with said proper VPI and VCI; and a mask set up means, responsive to a link establishment signal in said ATM cell, for invalidating the comparison result in said comparison means, such that any VPI and VCI transmitted by said first station are deemed to be identical with said proper VPI and VCI.

2. The ATM communication system according to claim 1, wherein said signal processing means comprises a memory means for storing header information of said ATM cell which includes said link establishment request signal.

3. The ATM communication system according to claim 2, wherein said first station is a switchboard station connected with a general public network and said plurality of second stations are radio base stations.

4. The ATM communication system according to claim 1, wherein said first station is a switchboard station which is connected with a general public network, and said plurality of second stations are radio base stations.

5. A method for establishing a link between a radio base station and a switchboard station, comprising the steps of:

receiving all the ATM (Asynchronous Transfer Mode) cells transmitted by said switchboard station, regardless of the VPI(Virtual Path Identifier) and VCI (Virtual Channel Identifier) written in said ATM cells by masking a comparison result between said VPI and VCI written in said ATM cells and a proper VPI and VCI for said radio base station, until said radio base station receives an ATM cell which includes a link establishment request signal;

comparing the VPI and VCI which are written in said ATM cell with the proper VPI and VCI for said radio base station; and transmitting another ATM cell from said switchboard station to said radio base station, when the VPI and VCI received by said radio base station is found to be identical with said proper VPI and VCI for said radio base station.

6. The method for establishing said link according to claim 5, wherein said radio base station transmits a link establishment response signal and header information which includes said link establishment request signal.

7. The method for establishing said link according to claim 6, wherein said radio base station deems, as the proper VPI and VCI for said radio base station, the VPI and VCI written in the ATM cell which includes said link establishment request signal, and compares said proper VPI and VCI with VPI and VCI transmitted by said switchboard station.

8. The method for establishing said link according to claim 5, wherein said radio base station deems, as the proper VPI and VCI for said radio base station, the VPI and VCI written in the ATM cell which includes said link establishment request signal, and compares said proper VPI and VCI with VPI and VCI transmitted by said switchboard station.

9. A method for establishing an in initial communication link between a switchboard station and radio base station having an unassigned proper virtual path identifier (VPI) and an unassigned virtual channel identifier (VCI), comprising the steps:

transmitting from said switchboard station an asynchronous transfer mode (ATM) cell having a VPI and VCI contained therein;

receiving said ATM cell including said VPI and said VCI by said radio base station;

masking a comparison result for comparing said received VPI and said VCI such that said radio base unit deems said received VPI and VCI as its proper VPI and VCI;

if said ATM cell further comprises a link establishment request signal, transmitting a link establishment response signal from said radio base station to said switchboard station, said line establishment response signal comprising an ATM cell including said received VPI and VCI, wherein a communication link is established between said switchboard station and said radio base station.

* * * * *